US 008016300B2

(12) United States Patent
Cramer et al.

(10) Patent No.: US 8,016,300 B2
(45) Date of Patent: Sep. 13, 2011

(54) MOBILE CART HAVING A RETRACTABLE-WHEEL BASE SYSTEM

(75) Inventors: Paul Cramer, San Clemente, CA (US); Steven Coffman, Moreno Valley, CA (US)

(73) Assignee: Cramer Decker Industries, Santa Ana, CA (US)

( * ) Notice: Subject to any disclaimer, the term of this patent is extended or adjusted under 35 U.S.C. 154(b) by 475 days.

(21) Appl. No.: 12/243,744

(22) Filed: Oct. 1, 2008

(65) Prior Publication Data

US 2009/0097957 A1   Apr. 16, 2009

Related U.S. Application Data

(60) Provisional application No. 60/976,612, filed on Oct. 1, 2007.

(51) Int. Cl.
 *B65D 19/42* (2006.01)
(52) U.S. Cl. ............... 280/43.14; 137/899.3; 211/85.18; 280/43.24; 280/79.3; 414/608
(58) Field of Classification Search ............... 280/43, 280/43.13, 43.14, 43.24, 79.3, 79.6; 137/899.3; 211/85.18; 414/474, 608, 623
See application file for complete search history.

(56) References Cited

U.S. PATENT DOCUMENTS

| | | | | |
|---|---|---|---|---|
| 2,317,064 A | * | 4/1943 | Josephian | 280/1 |
| 2,981,350 A | * | 4/1961 | Zouck et al. | 180/9.1 |
| 3,602,368 A | * | 8/1971 | Gould | 206/598 |
| 3,754,385 A | * | 8/1973 | Hoffmeyer | 56/17.2 |
| 4,335,658 A | | 6/1982 | VanderKelen | |
| 4,481,972 A | * | 11/1984 | Stavlo | 137/376 |
| 5,078,415 A | * | 1/1992 | Goral | 280/79.2 |
| 5,102,122 A | | 4/1992 | Piane, Jr. et al. | |
| 5,176,265 A | * | 1/1993 | Bennett | 211/85.18 |
| 5,249,438 A | | 10/1993 | Rhaney et al. | |
| 5,292,012 A | * | 3/1994 | Davis et al. | 211/85.18 |
| 5,551,715 A | * | 9/1996 | Pickard | 280/43.24 |
| 5,628,522 A | * | 5/1997 | Hall | 280/43.17 |
| 5,701,843 A | | 12/1997 | Lazides | |
| 5,882,018 A | * | 3/1999 | Petrosino | 280/7.13 |
| 6,059,127 A | * | 5/2000 | Bennett | 211/85.18 |
| 6,450,509 B2 | | 9/2002 | Adams | |
| 6,520,514 B2 | | 2/2003 | Clegg | |
| 7,017,741 B1 | * | 3/2006 | Williamson | 206/386 |

FOREIGN PATENT DOCUMENTS

| | | | | |
|---|---|---|---|---|
| JP | 1-269669 A | * | 10/1989 | 280/43.13 |
| JP | 4-011555 A | * | 1/1992 | 280/43 |

OTHER PUBLICATIONS

Kenneth Hardin, et al., Modified Bowling Ramp, North Carolina State University, Raleigh, NC; pp. 108-109.

* cited by examiner

*Primary Examiner* — James Keenan
(74) *Attorney, Agent, or Firm* — Alston & Bird LLP

(57) ABSTRACT

A mobile cart for carrying a plurality of fluid canisters. The cart includes a platform configured to support the fluid canisters. The cart also includes a base having a base body and a plurality of wheels movably connected to the base body so that the wheels can be selectively moved with respect to the base body between an extended position and a retracted position. In the extended position, the plurality of wheels extends from the base body so the cart can roll, on the plurality of wheels, over the support surface supporting the cart. In the retracted position, the plurality of wheels is retracted relative to the base body so that the cart cannot roll, on the plurality of wheels, over the support surface.

17 Claims, 6 Drawing Sheets

MOBILE CART HAVING A RETRACTABLE-WHEEL BASE SYSTEM

CROSS-REFERENCE TO RELATED APPLICATION

This application is a Non-Provisional application of U.S. Provisional Application No. 60/976,612, filed Oct. 1, 2007, which is incorporated herein by reference, together with any and all attachments and exhibits thereto. The full benefit and priority is claimed.

FIELD OF THE INVENTION

Various embodiments of the present invention relate to carrying carts and, more specifically, to carts for carrying heavy items having a retractable-wheel system for selectively changing the cart between a stationary mode and a mobile mode.

BACKGROUND OF THE DISCLOSURE

Heavy items and machinery often need to be moved in commercial and industrial environments. For example, packagers, distributors, and end users of canisters holding compressed fluids (e.g., oxygen, carbon dioxide, argon gas, propane, cryogenic fluids, and other liquids or gases) often need to move many canisters, which can weigh up to a total of 3,000 to 5,000 lbs when full. The common need to transport such heavy canisters led to development of conventional carting systems designed to carry multiple canisters, such as six or twelve canisters. These conventional carts include a heavy-duty platform on which the canisters are placed and some form of securing elements, such as straps wrapped around the canisters or an internal frame having internal welds, for holding the canisters together.

Due to the heaviness of canisters carried by conventional carts and a need to move the carts when loaded, some carts were outfitted with a hook connected to the platform by which the cart and items could be hoisted (e.g., by crane), such as from a warehouse or packaging plant to a moving vehicle and facilities of an end user. However, it was often difficult and/or inefficient to move these conventional carts relatively small distances. For example, sometimes movement of the cart was needed in areas where most cranes could not go. Also, even when the area was crane-accessible, it was cost prohibitive to move the crane to the area for moving the cart small distances and it was sometimes awkward using a crane to finely locate the cart in a position, such as in a tight space between other machinery.

For allowing small-distance transport and fine positioning of heavily loaded carts without using heavy machinery, some conventional carts were designed to include casters, or swivel wheels. Although these types of carts can be movable from place to place, the wheels often break or fail, causing bodily injury or even death. Accordingly, there is a need for mobile carts for heavy items such as gas canisters, which are safe to use.

BRIEF SUMMARY OF THE DISCLOSURE

The present invention includes embodiments of a mobile cart for carrying a plurality of fluid canisters. The cart includes a platform configured to support the fluid canisters. The cart also includes a base having a base body and a plurality of wheels movably connected to the base body so that the wheels can be selectively moved with respect to the base body between an extended position and a retracted position. In the extended position, the plurality of wheels extends from the base body so the cart can roll, on the plurality of wheels, over the support surface supporting the cart. In the retracted position, the plurality of wheels is retracted relative to the base body so that the cart cannot roll, on the plurality of wheels, over the support surface.

BRIEF DESCRIPTION OF THE DRAWINGS

Having described various embodiments of the invention in general terms, reference will now be made to the accompanying drawings, which are not necessarily drawn to scale, and wherein.

DETAILED DESCRIPTION OF THE VARIOUS EMBODIMENTS

Figure 1:
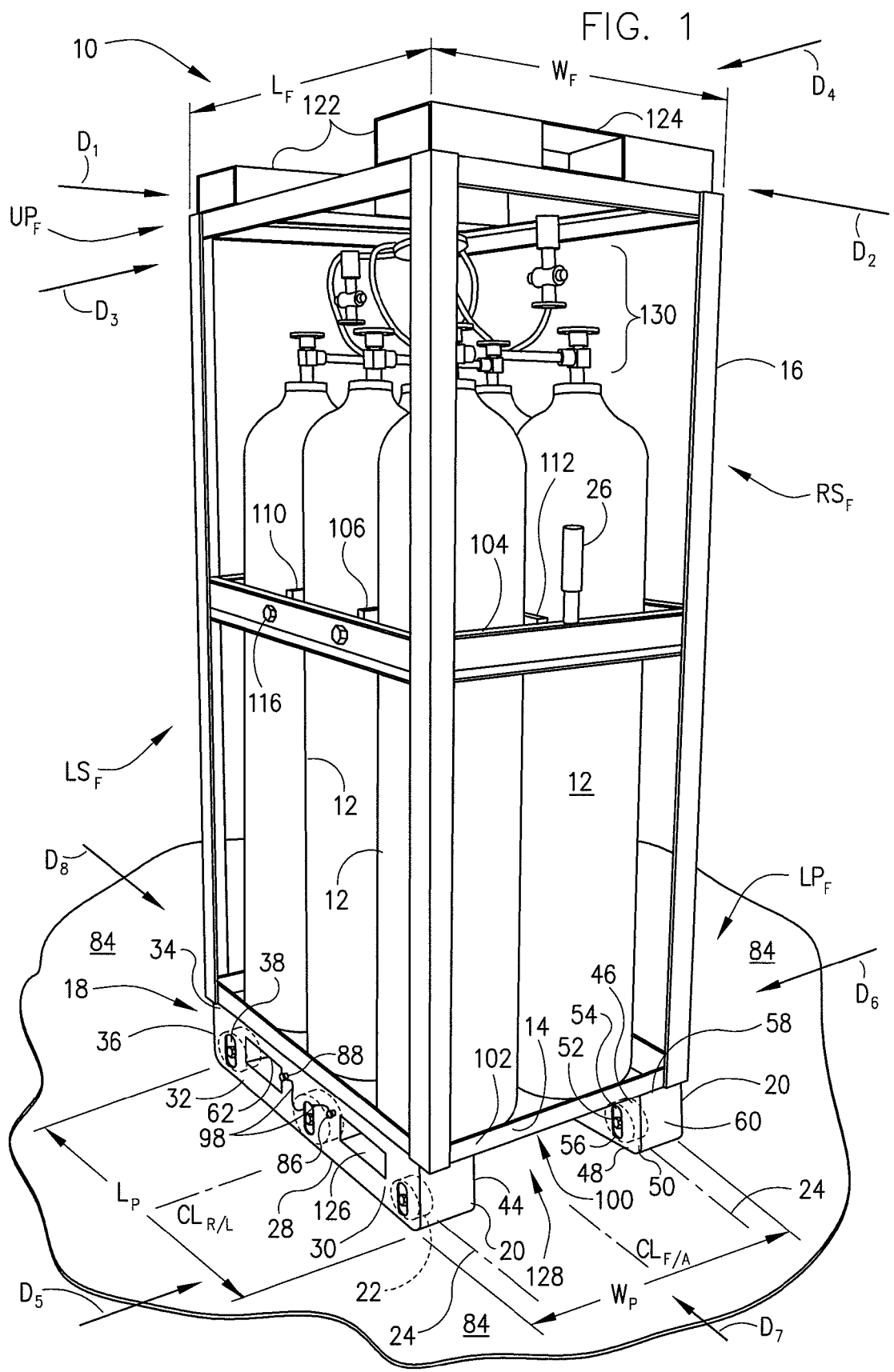
FIG. 1 is a perspective view of a mobile cart according to a particular embodiment of the present invention shown loaded with items.

The present invention will now be described more fully hereinafter with reference to the accompanying figures, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

Various embodiments of the present invention include carrying carts for holding and transporting items, such as fluid-filled containers. The carts may include a platform on which the items can rest and may include a frame connected to the platform. In some embodiments, the frame extends generally upward from the platform. The frame and the platform may secure the items in place. In particular embodiments, the platform is also connected to a base that comprises both a base body, and a cartridge that comprises one or more wheels that is slidable with respect to the base body. In various embodiments, the cartridge and the wheels are together slidable between a retracted position, in which the wheels do not extend below a bottom of the base body, and an extended position, in which at least some of the wheels extend below the bottom of the base body.

The cart may further include one or more lifting points, such as forklift channels and crane-eye hooks, by which the cart can be lifted for various purposes. For example, in particular embodiments, the cart is adapted so that it can be engaged at these points by a forklift or a crane, as described below in more detail, and lifted. This may make it easier for a user to transition the base between a retracted position and an extended position. In various embodiments, the cart is configured so that it may be lifted and moved, such as for moving to a far-away location (e.g., on another side of a large factory), to an upper floor of a high-rise building site (e.g., using a crane and the crane-eye hooks), or to a bed of a delivery truck for transport.

In operation, the cart may be rolled when it is in the mobile mode in which the wheels at least partially extend from the bottom of the base of the cart. The wheels may be secured in the extended position in a variety of ways without departing from the scope of the present invention. In one embodiment, as described in further detail below, the cart includes securing pins for passing through corresponding securing pin openings in the base body and passing either over a top of the cartridge or through any securing pin openings in the cartridge that are aligned with the pin openings of the base body when the cartridge is in the extended position. Thus, in particular embodiments, the user may position the pins in the openings when the cartridge and wheels are moved to the extended position thereby preventing the cartridge and wheels from moving substantially away from that position.

For transitioning the cart from the rolling mode to the standing mode, the user may remove the securing pins, move the cartridge and wheels to the retracted position, and replace the securing pins in the openings of the base body and through openings in the cartridge for holding the cartridge and wheels connected thereto in the retracted position. To facilitate transitioning the cart between the standing and rolling modes, the user may: (1) lift the cart, such as by forklift or crane, before unlocking the cartridge and wheels from being fixed in a particular position (e.g., removing the pins while the cartridge and wheels are retracted); (2) moving the cartridge and wheels to a new desired position (e.g., to the extended position); and (3) locking the cartridge and wheels in the desired position.

Referring to the figures, and more particularly to FIG. 1, a stationary/mobile cart according to a first embodiment of the present invention is designated in its entirety by reference number 10. The mobile cart 10 may be configured for carrying a variety of items 12 including canisters of fluid, such as the cylinders of compressed gas described in the Background of the Disclosure section, above. Other exemplary items 12 that the cart may be configured to carry include other containers and machinery (e.g., a large water purifying unit or a computer server tower). The mobile cart 10 may be used to carry one or more items 12 that the user of the cart wishes to be stationary at some time and moved at another time. For example, the mobile cart 10 may carry a machine or fluid-holding containers that are stationary while being used and accessed for their fluid, respectively. Further, the mobile cart 10 is designed to facilitate movement of the items 12, such as during installation, removal, or relocation of the items. The mobile aspect of the cart 10 can be especially useful for handling heavy loads. As described further below, the mobile cart 10 may be designed to carry loads weighing between a few hundred pounds to 5,000 lbs or more.

The mobile cart 10 includes a platform 14 and a frame 16 connected to and extending upward from the platform 14. The platform 14 may be formed as part of the frame 16 or separate from the frame. The platform 14 and frame 16 are configured to support the items 12. More specifically, the platform 14 and the frame 16 are sized and shaped and include materials for securely supporting items 12 having various characteristics (e.g. size, shape, weight, and temperature ranges). The frame 16 includes a right side $RS_F$, a left side $LS_F$, an upper portion $UP_F$, and a lower portion $LP_F$. The size, shape, and materials of the platform 14 and frame 16 are described more below.

Figure 2:
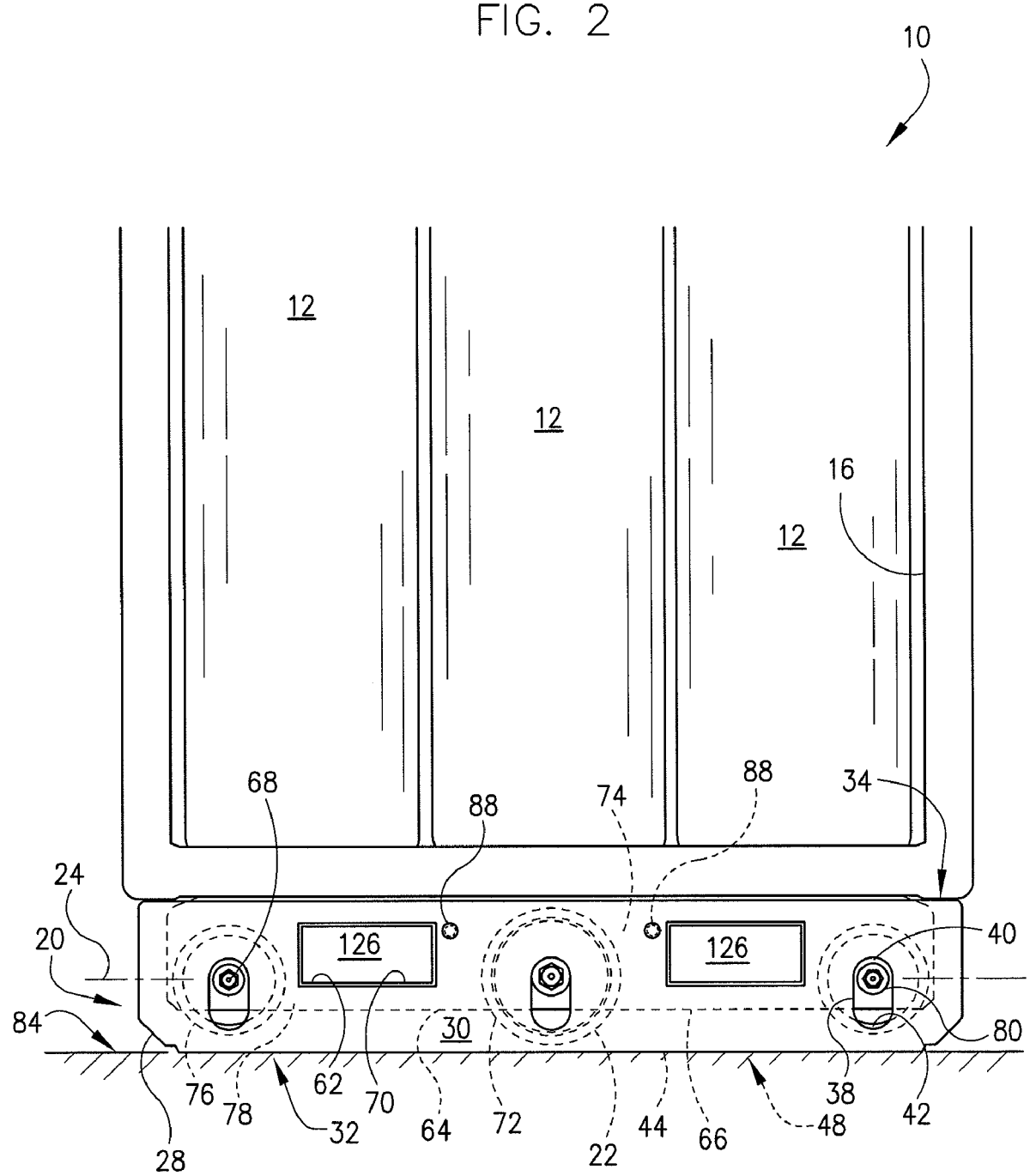
FIG. 2 is a side view of a bottom portion of the cart shown in FIG. 1 shown in a stationary mode.

The mobile cart 10 further includes a base 18 connected to the platform 14 and to the lower portion $L_F$ of the frame 16. The base 18 may be formed as part of the platform 14 and/or the frame 16 or may be formed separate from one or both of the platform 14 and the frame 16 and attached to them, such as by welding. The base 18 may be totally or at least partially positioned below the platform 14 and the frame 16 when the cart 10 is upright, as shown in the figures. The base 18 includes one or more base systems 20 including one or more retractable or hide-away wheels 22. Although the wheels 22 of each base system 20 may be arranged in various ways without departing from the scope of the present invention, in one embodiment, the wheels 22 of each base system 20 are generally aligned. For example, the wheels 22 of each base system 20 may be strictly aligned along a wheel line 24 for the respective base system 20, each wheel 22 lying generally on the line 24, or, as shown in FIG. 2, generally aligned along such a wheel line 24 by lying close to the line 24 on one side of the line 24 or the other. In either case, the wheels 22 may be said to be inline according to this description of the invention.

The figures show embodiments of the cart 10 having two base systems 20: a first and a second base system. These first and second base systems 20 may also be referred to in this description as right and left base systems 20. Although the terms right and left are used for distinguishing dual base systems, and also for distinguishing other parts of the cart, such as right/left sides of the frame 16 or platform 14, such usage does not indicate that the cart 10 necessarily has a particular forward or rearward direction. That is, although one side of the frame 16 is referred to as the right side $RS_F$, the user may push or pull the cart 10 so that that side is toward the right or toward the left from the user's perspective. Similarly, although the cart 10 may include one or more handling elements 26, such as the one handle 26 shown in FIG. 1 or multiple handles 26 shown in FIG. 5 on an end of the cart 10, forward or rearward direction is not necessarily implied as, again, the user may push or pull the cart 10 as desired.

Each base system 20 includes a base portion, or base body 28 with respect to which the retractable wheels 22 retract and extend. The base body 28 may be a variety of structures, such as a casing or housing. As described above, the base 18 may be formed as part of the platform 14 and/or the frame 16 of the mobile cart 10 or may be formed separate from one or both of the platform 14 and the frame 16 and attached to them, such as by welding. Specifically, in various embodiments, the base body 28 of the base 18 may be formed as part of the platform 14 and/or the frame 16 of the cart 10 or formed separate from them. In various embodiments, each base body 28 includes at least one outer wall 30 having a bottom 32, a top 34 and ends 36. The outer wall 30 of each base system 20 may be visible to the user, such as shown in FIG. 1, or may be hidden from view by a covering (not shown).

In particular embodiments, the outer wall 30 includes multiple slots 38, each slot 38 corresponding to a particular one of the multiple wheels 22 of the base system 20. Although each base system 20 may include other numbers of wheels 22 without departing from the scope of the present invention, in one embodiment each base system 20 includes three wheels 22, as shown in the figures. Accordingly, the outer wall 20 of the base body 28 may include three slots 38, with one respective slot 38 corresponding to each of the three wheels 22. As shown in FIG. 2, each slot 38 in the base body 28 extends generally vertically between a top 40 of the slot 38 and a bottom 42 of the slot 38.

As shown in FIG. 1, each base body 28 may include an inner wall 44 opposite the outer wall 30. The inner wall 44 also has a top 46, a bottom 48, ends 50, and generally vertical slots 52, each slot having a top 54 and a bottom 56. The inner wall 44 of the base body 28 may be connected adjacent (e.g., to) the outer wall 30 in various ways, such as by a top 58 of the base body adjacent the tops 34, 46 of the walls, end caps 60 adjacent one or both ends 36, 50 of the walls, and/or a partial floor (not shown; "partial" because, in particular embodiments, the floor includes one or more spaces through which the wheels 22 may extend to the position shown in FIG. 4) adjacent the bottoms 32, 48 of the walls 30, 44, and/or internal structures such as ribs (not shown) connecting the walls 30, 44 at points between the top 34, 46, the bottom 32, 48, and the ends 36, 50 of the walls 30, 44.

The outer wall 30 of the base body 28 may define at least one forklift hole or opening 62 that is sized and shaped for receiving a lifting fork of a conventional forklift. In particular embodiments, this forklift opening 62 is adapted to substantially mate with at least a portion of such a lifting fork. In various embodiments, such as the embodiment of FIG. 4, the outer wall 30 may define two forklift openings 62 that are spaced apart to allow the simultaneous insertion of two lifting forks of a conventional forklift or similar device (not shown) into the respective forklift openings 62. This helps in facilitating lifting and moving the cart 10.

For base bodies 28 having an inner wall 44, the inner wall 44 may also include at least one forklift opening 62 that is sized and shaped for receiving a lifting fork of a conventional forklift. In various embodiments, such as the embodiment of FIG. 4, the inner wall 44 may define two forklift openings 62 that are spaced apart to allow the simultaneous insertion of two lifting forks of a conventional forklift or similar device (not shown) into the respective forklift openings 62.

It is contemplated that the walls 30, 44 may, instead of having two spaced forklift openings, include a central forklift opening (not shown) forming a single forklift channel for receiving a single fork of a lifting device for lifting and moving the cart 10.

As shown in FIG. 2, each base system 20 also includes a cartridge 64 positioned at least partially within the base body 28 and slidably connected adjacent (e.g., to) the base body 28. In various embodiments, the cartridge 64 is connected adjacent the base body 28 so that the cartridge 64 may slide up and down with respect to the base body 28. In particular embodiments, each cartridge 64 includes a cartridge body 66 and an axle 68 that extends from the cartridge body 66 and that corresponds to a particular wheel 22 of the base system 20. The wheels 22 are rotatably connected to the corresponding axles 68 allowing free rotation of the wheels 22 about the axles 68. In one contemplated embodiment of the present invention, the wheels 22 are fixedly attached to the axles 68 and rotate with the axles 68 as the cart 10 rolls over a support surface.

For embodiments of the mobile cart 10 in which each base body 28 has forklift openings 62 as described above, the cartridge body 66 may also include forklift openings 70 alignable with the forklift openings 50 of the base body 28 so that one or more forklift channels may be formed for receiving the forklift forks. For example, FIG. 2 shows the base system 20 in a retracted position and the forklift openings 62, 70 of the base body 28 and the cartridge body 66 aligned. In one embodiment (not shown), the cartridge body 66 is shaped so that one or more forklift channels including the forklift openings 50 of the base body 28 are formed when the base system 20 is in an extended, or "down", position allowing lifting by forklift by way of the channels (including the forklift openings 50 of the base body 28) while the wheels 22 extend beneath the base body 28.

The wheels 22 may be connected adjacent (e.g., to) the cartridge body 66 in a variety of ways without departing from the scope of the present invention. For example, each wheel 22 may be positioned on one or another side of the cartridge body 66. For example, as shown in FIG. 2, multiple wheels 22 may be positioned on opposite sides of the cartridge body 66, generally along the wheel line 24. Specifically, FIG. 2 shows a middle wheel 72 of the multiple wheels 22 positioned adjacent an outside 74 of the cartridge body 64, and two outer wheels 76 of the multiple wheels 22 positioned adjacent an inside 78 of the cartridge body 64 opposite the outside of the cartridge body 64. As will be appreciated by those skilled in the art in light of this disclosure, such relative positioning of the wheels 22 about the cartridge body 66 provides balance by stabilizing forces applied to the cartridge 64 when the cart 10 rests or rolls on the wheels 22.

It is contemplated that forces applied to the cartridge 64 can also be balanced by way of other configurations of the base system 20. For example, in one embodiment (not shown in detail), each base system 20 includes two wheels 22 on each axle 68, one adjacent each side 74, 78 of the cartridge body 66. In another contemplated base system 20 configuration (not shown), axles 68 for adjacent wheels 22 are connected on both sides of each wheel 22 by additional cartridge body material or other connectors, such as rods extending in the fore/aft direction. Thus, in various embodiments, axles 68 of any two adjacent single wheels 22 can be connected by two rods, one fore/aft rod connected to the axles 68 on either side of the wheels 22, and axles 68 of any two adjacent dual-wheel arrangements can be connected by a single fore/aft rod connected to the adjacent axles between each wheel of each dual wheel set. In yet another contemplated base system 20 configuration, axles 68 of single inline wheels may be connected by a cartridge body having a pocket or wheel case (not shown) including cartridge body material on both sides of each wheel to which the axles 68 are connected so that the wheel is generally centered between the two sides of material and aligned on the wheel line 24. In this embodiment, the additional side material can continue as separate sides between adjacent axles or can combine between adjacent wheel areas into a single piece.

In various embodiments, each axle 68 is slidably positioned partially within a corresponding slot 38 of the outer wall 30 of the base body 28 and, for base bodies having an inner wall 44, within a corresponding slot 52 of the inner wall. In this way, the axles 68 can slide to a first position, such as up, in the slots 38, 52 toward the tops 40, 54 of the slots 38, 52 as the cartridge 64 is moved to the first position, retracted, position (shown in FIG. 2) (e.g., ascended to the up position) and can slide to a second position, such as down in the slots 38, 52, toward the bottoms 42, 56 of the slots 38, 52 toward an extended position (shown in FIG. 4).

In particular embodiments, each axle 68 may include and/or be connected to various elements for holding the wheel 22 onto the axle 68, controlling positioning of the wheel 22 with respect to the axle 68, the cartridge body 66, and the base body 28, and securing the axle 68 to the outer and inner walls 30, 44 of the base body 28 and/or the cartridge body 66. Such elements of the axles 68 may also facilitate smooth movement of the wheels 22 on the axles 68 and of the axles 68 with respect to the slots 38, 52. Designing such axle elements is within the ability of those skilled in the art and may include conventional elements used for such purposes.

Exemplary axle elements for holding the wheels 22 in place include spacers 80 such as washers positioned on one or both sides of one or more of the wheels 22 for maintaining a desired positioning of each wheel 22 with respect to the base body walls 30, 44 and/or the cartridge body 66. Such positioning may be calculated to ensure, for example, the wheel 22 can move as desired. Exemplary axle elements for securing the wheels 22 to the axles 68 include fasteners 82 such as bolts or cotter pins (not shown) connectable to the axles 68. The fasteners 82 may have corresponding characteristics, such as threads in the axle 68 for a bolt or a cotter pin hole or opening to accommodate a cotter pin.

It is contemplated that each base system 20 may include springs or other biasing elements for biasing the cartridge 64 toward one position or another, such as an up or down position. In some embodiments, in order to move the cartridge 64 between positions, such as up and down positions, the cart 10 may be lifted and held off of the ground or floor 84 (e.g., the floor of a warehouse or a delivery truck). Holding the cart 10 off of the floor 84 can be especially useful for some embodiments of the cart 10 when the cart 10 and/or its load (i.e., items 12) are heavy. In some embodiments, when the cart 10 is held off of the floor 84 so that the base systems 20 are separated from the floor 84, the cartridge 64 can more easily be moved between the retracted and extended positions. Such lifting of the cart 10 may be performed by forklift, crane, or other lifting device, as mentioned above and described in further detail below.

As shown in FIG. 2, in various embodiments, when the cartridge 64 is in the retracted position, the wheels 22 are retracted into the base body 28 such that the wheels 22 do not extend substantially below the bottom 32, 48 of the inner and outer walls 30, 44 of the base body 28. The cartridge 64 may be secured in the retracted position in a variety of ways, such as by securing pins 86 inserted in securing pin holes or openings 88, as described below in further detail.

In particular embodiments, when the cartridge 64 is retracted, the cart 10 standing upright on the ground 84 will rest on the bottoms 32, 48 of the base body walls 30, 44, and the bottom of the base body 28, which will directly contact the ground 84. When all of the cartridges 64 are retracted into the base bodies 28 and secured in that position (e.g., up position), the stationary/mobile cart 10 may be said to be in a standing or stationary mode.

Figure 4:
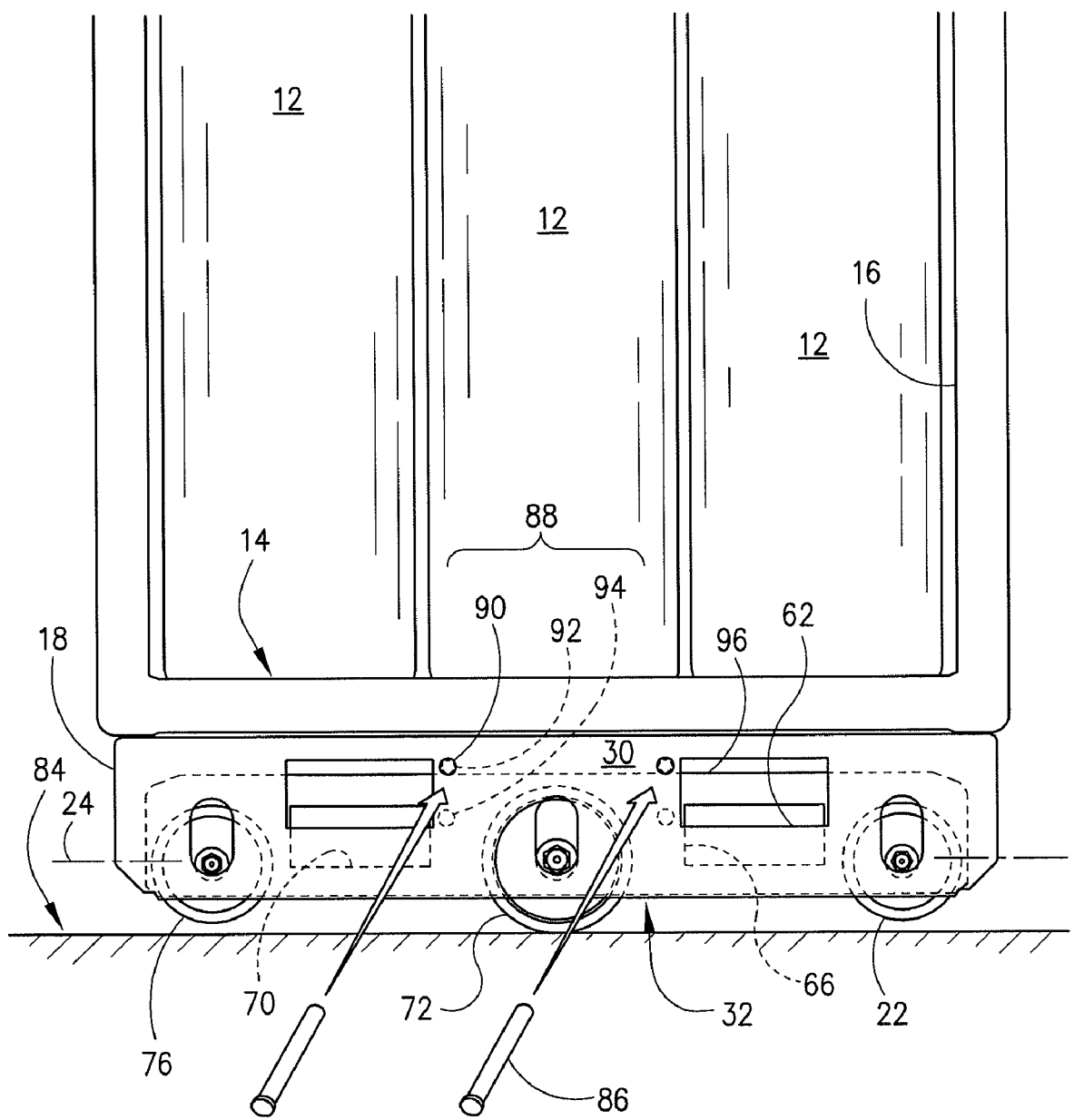
FIG. 4 is another side view of the bottom portion of the cart of FIG. 1 showing reinsertion of the securing pins for securing the cart in the mobile mode.

As shown in FIG. 4, when the cartridge 64 is moved to the extended position, the wheels 22 move at least partially out of the base body 28 such that the wheels 22 at least partially extend below the bottom 32, 48 of the inner and outer walls 30, 44 of the base body 28. The cartridge 64 may be secured in the extended position in a variety of ways. For example, in some embodiments a user can insert the securing pins 86 into the securing pin openings 88 of at least the outer wall 30 and inner wall 44. When the cartridge 64 is secured in the extended position and the cart 10 is positioned upright on the floor 84, the wheels 22 will contact the floor 82 and the cart can thus be pushed or pulled for rolling. In various embodiments, when all of the cartridges 64 are descended with respect to the base bodies 28 and secured in that down or extended position, the stationary/mobile cart 10 may be said to be in a rolling or mobile mode.

For embodiments of the mobile cart 10 according to the present invention having two or more separate base systems 20, and thus two or more separate cartridges 64, it is contemplated that these cartridges 64 may be directly connected together (not shown) so that the cartridges 64 move (e.g., ascend) with respect to the base body or bodies 28 to the retracted (e.g., up) position, or move (e.g., descend) with respect to the base body or bodies 28 to the extended (e.g., down) position together as a single unit.

Although the figures show wheels 22 that are non-swiveled, freely rotatable, and strictly or generally inline in each base system 20, the cart 10 may include other wheel arrangements. For example, it is contemplated that the cartridge 64 may include a braking or locking system (not shown in detail), such as a conventional wheel-locking system by which the wheels 22 may be selectively kept from freely rotating. As another example, the base system 20 may be configured to accommodate one or more of the wheels 22 being swiveled, caster-type wheels. To accommodate caster wheels, in particular embodiments, the base body 28 may have a deeper (i.e., taller) interior to provide space for structure connecting an axle of each caster wheel to the cartridge body 66 at a point above the wheel. Also, it is contemplated that the generally vertical wall slots 38, 52 in the base body 28 may not be needed adjacent caster wheels.

Figure 3:
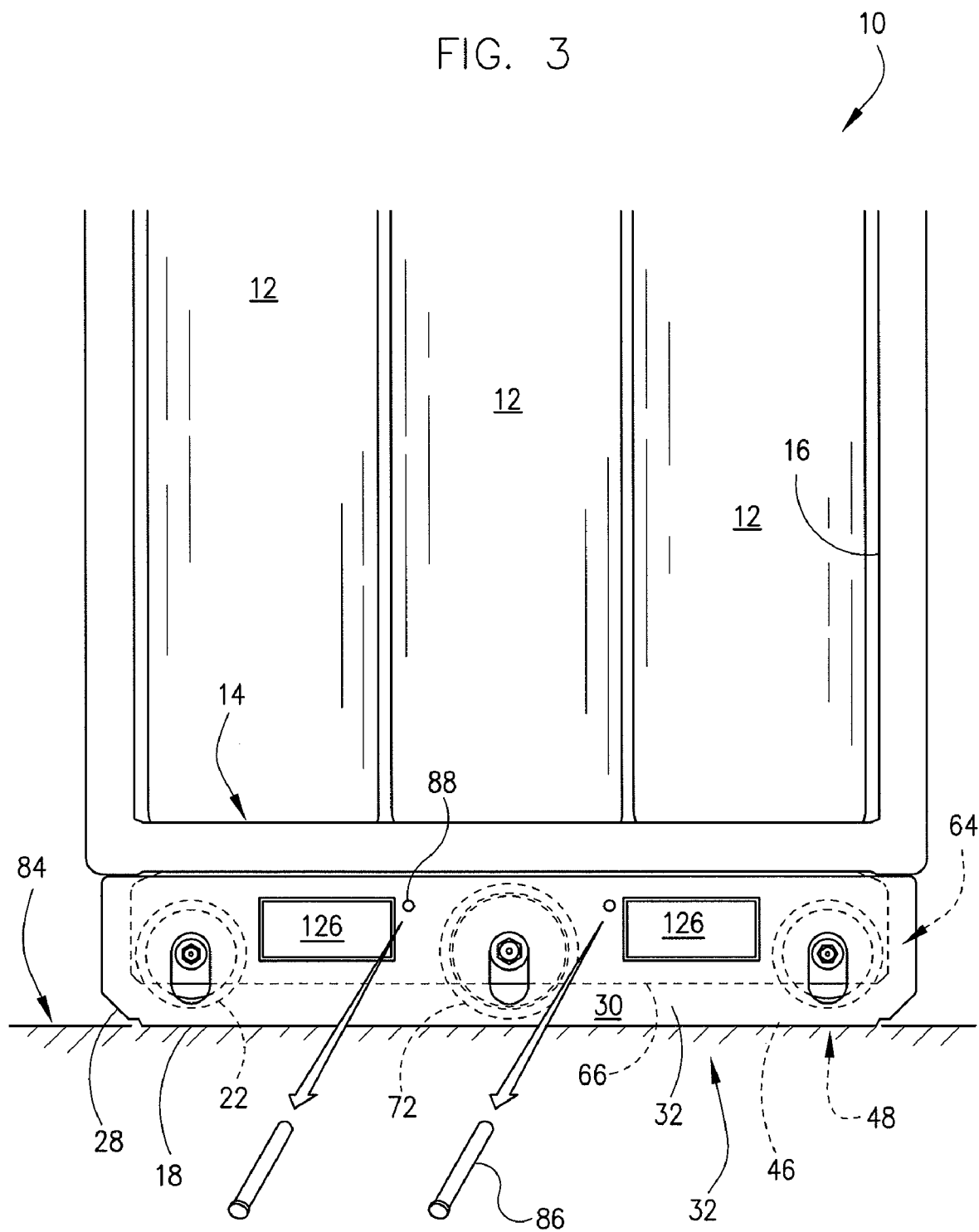
FIG. 3 is another side view of the bottom portion of the cart of FIG. 1 showing the removal of securing pins for transitioning the cart to a mobile mode.

For embodiments of the mobile cart 10 having three or more wheels 22 per cartridge 64, a middle or other internal wheel 72 (i.e., not an end wheel) may be larger (e.g., have a larger diameter) than the other wheels 76, as shown in FIGS. 2-4. For example, the outer wheels 76 may be generally equally sized and the middle wheel 72 may be larger. Such a larger middle wheel 72 may provide a pivot point about which the user of the cart 10 may tilt the cart 10 for assisting in turning the cart 10. Such a pivot point may be especially helpful when the wheels 22 do not swivel.

In various embodiments, the base systems 20 are configured to reliably support the weight of the cart 10 and heavy loads thereon. For example, the cart 10 can include various types of heavy-duty wheels 22 without departing from scope of the present invention. Although the wheels 22 may be those made of various materials without departing from the scope of the present invention, in one embodiment each wheel 22 includes a phenolic material, such as wheels available from Colson Caster Corporation, of Jonesboro, Ark. Phenolic wheels are often preferred for use on carts over other wheel types, such as steel wheels, because phenolic wheels are generally gentler on floorings, such as smooth concrete, painted, and tiled floors, while still being durable and strong enough to support heavy loads. Phenolic wheels can also be non-marking, and generally resistant to corrosion from oil, water, grease and commonly used acids or solvents.

The cartridge 64 may further include bearing systems (not shown in detail) and/or other conventional systems and applications (e.g., lubrication) for facilitating rotation of the wheels 22 over time. Such systems may be especially effective considering the large loads that may be placed on the axles 68, cartridge body 66, and wheels 22 of the base system 20 when the cart 10 is set on the floor 84 in the mobile mode.

As described above, the cartridge 64 may be held in the retracted position (FIG. 2) and in the extended position (FIG. 4) in various ways without departing from the scope of the present invention. For example, as described above, the cart 10 may include one or more securing pins 86 and one or more securing pin openings 88 (show in FIGS. 3 and 4) for receiving the pins 86. As shown in FIG. 4, the securing pin openings 86 may include one or more securing pin openings 90 formed in the outer wall 30, one or more securing pin openings 92 formed in the inner wall 44, and one or more securing pin openings 94 formed in the cartridge body 66. For embodiments of the cart 10 having pairs of securing pin openings 90, 92, 94, each pair may include a first pin opening and a second pin opening and the pins 86 may include a first pin and a second pin.

Using the securing pin arrangement, the user may secure the cartridge 64 in the retracted position, as shown in FIG. 2, by positioning the cartridge 64 in the retracted position, thereby aligning the first pin openings of the pin openings 90, 92, 94 formed in the base body 28 and cartridge body 66 and aligning the second pin openings of the pin openings 90, 92, 94 formed in the base body 28 and cartridge body 66, and inserting the first and the second securing pins 86 into the respective first and second securing pin openings. The user secures the cartridge 64 in the extended position in this embodiment by moving the cartridge 64 down to the extended position and passing the first and second securing pins 86 through the respective first and second securing pin openings 90 of the outer wall 30, over a top 96 of the cartridge body 66, and through the respective first and second securing pin openings 92 of the inner wall 44, thereby securing the cartridge in the extended position by keeping the cartridge 64 from moving upward past the pins 86.

It is also contemplated that the cartridge body 66 may include an additional set of first and second securing holes or openings (not shown) formed in the cartridge body 66 above the securing pin openings 94 described above. These additional first and second securing openings can receive the securing pins 86 for holding the cartridge body 66 in an extended position. In this embodiment, instead of passing the securing pins 86 through only the securing pin openings 90, 92 of the base body walls 30, 44 and over the top 96 of the cartridge body 66 to secure the cartridge 64 in the extended position, the user passes the securing pins 86 through the respective first and second securing pin openings of the outer wall 30, through respective pin openings of these additional first and second securing pin openings of the cartridge body 66, and through the respective first and second securing pin openings of the inner wall 44.

The mobile cart 10 may include various features for keeping the securing pins 86 in their inserted positions and for keeping the securing pins 86 from being lost. In one embodiment of the present invention, the securing pins 86 include an engagement portion (not shown in detail), such as that in conventional bearing systems, for holding the pins in place in the securing pin openings 88 as desired. Such conventional bearing arrangements include an engaging portion, usually a ball, being inserted into a cavity of the securing pin and biased by a spring load toward an engaged position in which at least a portion of the engaging portion extends beyond an outer surface of the securing pin.

The engaging portion of such conventional bearing systems is retracted partially or fully into the cavity of the pin to allow the pin to be pushed/pulled into/from snug compartments such as the securing pin openings 88 in a variety of ways. In one way, the securing pin is simply pushed or pulled from its securing position (e.g., in the securing pin openings 88) with sufficient force causing an engaging portion (e.g., ball) of the pin to be pushed or pulled into contact with the adjacent surface (e.g., an edge of the securing pin opening 92 in the inner wall 44) creating a force on the engaging portion sufficient to move the engaging portion totally or at least partially into the cavity, thereby allowing the pin to smoothly pass into/out of the opening. After the securing pin passes the wall 30, 44 or other structure (e.g., cartridge body 66) whose force was pushing the engaging portion into the cavity of the securing pin and the engaging portion no longer contacts the wall or structure, the engaging portion returns to its engaged position extended at least partially beyond the surface of the pin.

According to another conventional pin design having an engaging portion (not shown), the securing pin includes a button, such as on an end of the pin, connected to the engaging portion by structure within the pin so that depressing the button causes the engaging portion to retract. This type of system is common in many socket-type tools (e.g., wrenches) allowing "quick-release" changing of tool heads. In this embodiment, the user pushes the button to retract the engaging portion from its engaging position, allowing the user to insert and remove the pin as desired, and releases the button to allow the engaging portion to return to its engaging position, such as by spring loading, allowing the user to secure the pin in place in the openings 88.

As shown in FIG. 1, the cart 10 may include a flexible connector 98 such as a cord flexibly fastening the securing pins 86 to the platform 14, frame 16, or base 18 so that the pins 86 will not be lost while removed from securing pin openings 88. In another contemplated embodiment (not shown), the base body 28 includes one or more receptacles or pouches for receiving and holding the pins 86. In general, features for holding the securing pins 86 when they are not inserted in the securing pin openings 88 may not be needed because the cart 10 is designed so that the pins 86 are generally only briefly removed from the openings 88 for moving the cartridge 64 between the retracted and extended positions and immediately replaced in the securing pin openings 88 to secure the cartridge 64 in the desired position.

In yet another contemplated embodiment for the securing pins (not shown), the pins may be slidably disposed in a pin housing, which is in turn rigidly connected to the outer wall 30 of the base body 28. In this embodiment, the pin may be, but need not be, biased, such as by spring, toward an engaged position in which the pin passes through the pin openings 88 of the base system. To disengage the pin for allowing movement of the cartridge 64 with respect to the base body 28, the user simply pulls on an exposed end of the pin or a handle connected to the end of the pin. After the cartridge 64 has been positioned as desired, the user pushes the pin, or allows the pin to return under the spring bias, back to its engaged position, thereby securing the pin in place.

Although two securing pins 86 and groups of two securing pin openings 90, 92, 94 are shown in the figures, the cart 10 may include other amounts of securing pins 86 and corresponding pin openings 90, 92, 94 for use in selectively securing the cartridge 58 in the retracted and extended positions.

Further, it is contemplated that the base body 28 and cartridge body 66 may include securing features other than the securing pins 86 and securing pin openings 88 described above. As will be appreciated by those skilled in the art, a securing feature for this purpose comprises one or more base body securing elements positioned on the base body 28 (e.g., on the outer wall 30) of each base system 20 and one or more corresponding cartridge securing elements positioned on the cartridge body 66, or including the cartridge body itself (e.g., the top 96 of the cartridge body), configured to releasably couple or mate to selectively secure the cartridge 58 in the retracted and extended positions. Such securing features may include, for example, a spring-loaded detent connected to the base body 28 corresponding to a detent groove in the cartridge body 66, and other types of catch, hook, or pin systems.

Figure 5:
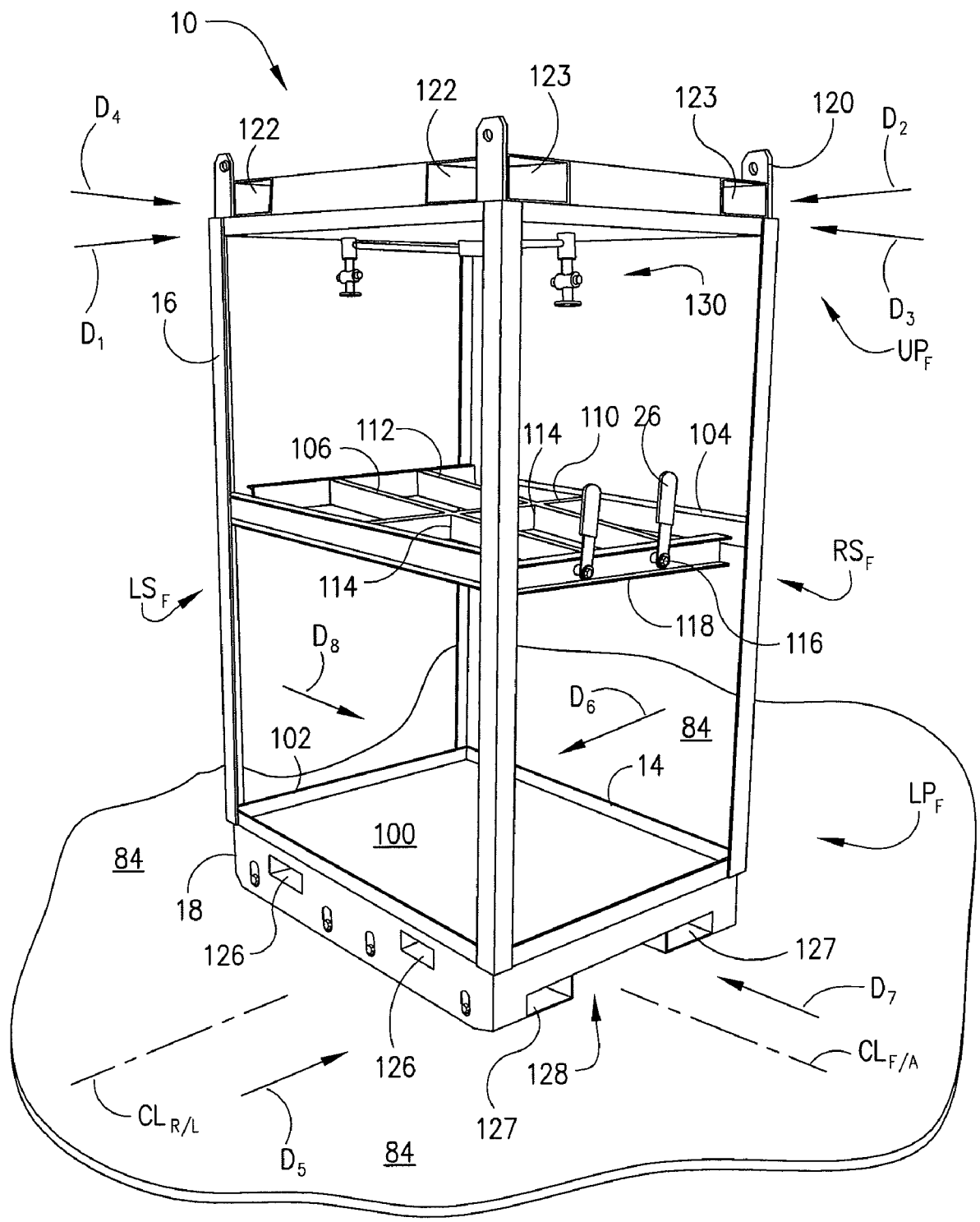
FIG. 5 is a perspective of the mobile cart according to another embodiment of the present invention.

As shown in FIGS. 1 and 5, the platform 14 may form a pan having a bottom 100 and side flanges or sides 102 extending up from the bottom. The platform 14 may also include one or more drain holes or openings (not shown in detail) formed in the bottom 100 and/or sides 102 for draining liquids, such as water from condensation, leaks, or spills, which may sometimes become disposed on or in the platform 14. The number, size, and location of the drain openings are designed to allow sufficient drainage while maintaining desired strength characteristics of the platform 14. For embodiments of the cart 10 having the drain openings, the bottom 100 and sides 102 may be shaped to promote drainage, such as including slopes or channels directing water toward the drains.

The platform 14 may be sized, shaped, and include materials selected to support items 12 within a wide range of shapes, weights, sizes, and other characteristics (e.g., temperature). In various embodiments, the mobile cart 10 including the platform 14 may be designed to support, for example, between a few hundred pounds and 5,000 lbs or more. In a particular exemplary embodiment, the platform 14 may be sized and shaped to hold between six to twelve containers 12, each having a maximum width (e.g., diameter) $W_I$ of between about 8 inches and about 11 inches. All dimensions provided herein are only exemplary and the cart 10 according to the present invention may be configured with any suitable dimensions.

Although the platform 14 may have other lengths $L_P$ without departing from the scope of the present invention, in one embodiment the platform 14 has a length between about 25 inches and about 45 inches. Although the platform 14 may have other widths $W_P$ without departing from the scope of the present invention, in one embodiment the platform 14 has a width between about 15 inches and about 35 inches. For example, in one particular embodiment of the mobile cart 10 configured to carry six cylinders 12, such as that shown in FIG. 1, the platform 14 has a length $L_P$ of about 32 inches and a width $W_P$ of between about 21 and about 22 inches. As another example, a mobile cart 10 configured to carry twelve cylinders 12 like those shown in FIG. 1, the platform 14 may have a length $L_P$ of about 39.5 inches and a width $W_P$ of about 29.5 inches.

Although the platform 14 may be made of other materials without departing from the scope of the present invention, in one embodiment the platform 14 includes steel, iron, or a strong synthetic (or semisynthetic) material, such as a thermoplastic, such as high-density polyethylene (HDPE). The platform 14 may be coated with various materials, such as by galvanization (i.e., coating steel or iron with zinc) or application of paint or enamel, for improving strength, resisting wear from environmental factors and handling, and affecting aesthetics.

As described above and shown in FIGS. 1 and 5, in particular embodiments, the frame 16 includes a right side $RS_F$, a left side $LS_F$, an upper portion $UP_F$, and a lower portion $LP_F$, and the lower portion of the frame is connected to the platform 14 of the cart 10. Although the frame 16 may have other heights $H_F$ without departing from the scope of the present invention, in one embodiment the frame 16 has a height $H_F$ between about 40 inches and about 90 inches. Although the frame 16 may have other lengths $L_F$ and other widths $W_F$ without departing from the scope of the present invention, in one embodiment the frame has a length of between about 25 inches and about 45 inches and a width between about 15 inches and about 35 inches.

For embodiments of the cart 10 having a frame 16 extending upward from the platform 14, the frame 16 may include various configurations of structural elements including external stabilizing elements 104. In particular embodiments, the cart 10 further includes internal stabilizing elements 106 for stabilizing the items 12 held by the cart 10. The stabilizing elements 104, 106 may include, for example, straps, metal bars, or other types of elements for positioning between and/or around the items 12 when the items 12 are loaded on the cart 10. The external stabilizing elements 104 may be part of the frame 16 or attached thereto in various ways, such as by welding or nut and bolt.

The internal stabilizing elements 106 extend into an interior 108 of the frame 16 and may include one or more left/right (L/R) stabilizing elements 110 and one or more fore/aft (F/A) stabilizing elements 112 extending between the external elements 104. The L/R and F/A stabilizing elements 110, 112 may cross each other without being fastened to each other, such as by welding. For example, the F/A stabilizing elements 112 may include a slot 114, shown in FIG. 5, through which the L/R stabilizing element 110 slides during assemblage of the cart 10.

In various embodiments, there may be potential benefits to having internal elements 106 lacking welds in the interior 108 of the frame 16. One benefit is that users and other inspectors of the cart 10 are better able to view all of the welds associated with the frame 16 and repair them as needed. In contrast, it is more difficult to view interior welds and reach and repair them. The ability to view all welds and hard connection points may also qualify the cart 10 for decreased scrutiny according to government regulations (e.g., United States Department of Transportation regulations). For example, government regulations may require less frequent maintenance inspections of the cart 10, and the generally arduous disassembly, unloading, and reloading of items 12 associated therewith, because the integrity of the visible connection points can be more easily viewed periodically without need for disassembly or unloading.

In particular embodiments, the external and internal stabilizing elements 104, 106 may be releasably connected to each other and/or the frame 16 so that they can be taken apart in various ways for assembly, disassembly, and loading and unloading items 12. For example, the cart 10 may further include various conventional removable fastening elements 116, such as nuts and bolts, connecting internal stabilizing elements 106 to external elements 104 and/or to the frame 16. The user may remove these fasteners for removing an external element for loading and unloading items 12. For example, FIG. 5 shows an end external element 118 separated from the frame 16, which can facilitate assembly or disassembly of the cart 10 and loading or unloading of items 12.

Figure 6:
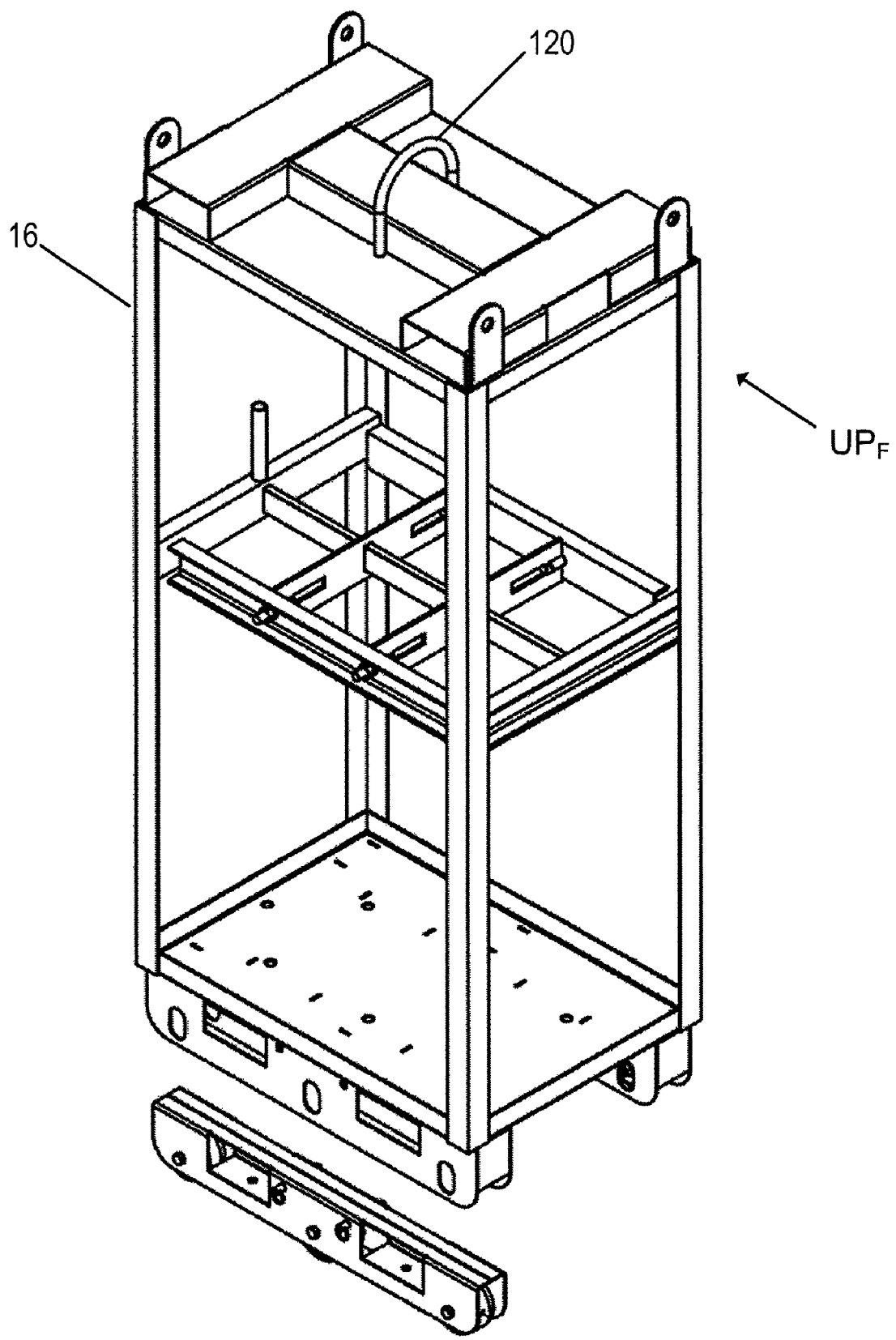
FIG. 6 is a perspective view of the mobile according to yet another embodiment of the present invention.

As shown in FIG. 5, the frame 16 may also include crane-eye hooks 120 to which a crane may connect to the cart 10 for lifting it. For example, in certain embodiments, the frame may form four crane-eye hooks 120, one at each corner of the frame 16. Lifting by crane-eye hooks 120 is especially useful in applications in which the cart 10 needs to be hoisted high in the air, such as from a dock to a ship or oil rig platform or from the ground up to a building being constructed. In one embodiment, shown in FIG. 6, the frame 16 forms a single eye hook 120 positioned generally at or about a center of the upper portion $UP_F$ of the frame 16. As with the multiple crane-eye hooks 120 described above, a crane may connect to such single eye hook 120 for hoisting the cart 10.

As shown in FIG. 1, the upper portion $UP_F$ of the frame 16 may include or be connected to structure forming multiple upper forklift channels to which the user of the cart 10 can temporarily connect for lifting and moving the cart. These channels may include a set of generally parallel forklift channels 122 accessible by either of two opposing directions $D_1$ and $D_2$. The upper portion $UP_F$ of the frame 16 may also form, or be connected to, structure forming a single forklift channel 124 accessible by either of two opposing directions $D_2$ and $D_4$. For embodiments of the cart 10 having both a set of dual upper forklift channels 122 and a single forklift channel 124, the single forklift channel are perpendicular to the dual channels (i.e., $D_1$ and $D_2$ are perpendicular to $D_3$ and $D_4$). Alternatively, the upper portion of the frame $UP_F$ may form two perpendicular single upper forklifts channels or, as shown in FIG. 5, two perpendicular dual upper forklift channels.

As described above, the base body 28 and cartridge body 66 adjacent the lower portion $LP_F$ of the frame 16 may be configured to form a lower set of generally parallel forklift channels 126, which can be accessed by either of two opposing directions $D_5$ and $D_6$. Further, the platform 14 and base 18 may be configured to form a single lower forklift channel 128 between the base systems 20 (or though a single base system in embodiments having a single base system (not shown)). In particular embodiments, the single lower forklift channel 128 is accessible by either of two opposing directions $D_7$ and $D_8$. Accordingly, the cart 10 may be said to have eight forklift points of entry, accessible by their respective eight directions $D_{1-8}$ discussed above.

In the embodiment shown in FIG. 1, the frame 16 and base 18 may be configured so that the dual forklift channels 122, 126 and single forklift channels 124, 128 extend in either of the left/right (L/R) direction or the fore/aft (F/A) direction. For example, although the upper dual forklift channels 122 are shown passing in a left/right direction and the upper single forklift channel 124 is shown passing fore/aft in FIG. 1, the cart 10 may be configured so that the double and single forklift channels 122, 124 extend in the other directions. As will be understood by those skilled in the art in light of this disclosure, whether a forklift access point includes dual fork channels 122, 126 or a single forklift channel 124, 128, the cart 10 including the structure forming the forklift access points should preferably be configured so that the cart is properly balanced with respect to forklifts attempting to lift it. For example, unless the cart 10 has a reflectively asymmetric weight distribution, the single fork access points should preferably lie on or close to the respective centerline $CL_{F/A}$, $CL_{R/L}$ and the dual fork access points should generally be spaced about equally on either side of the respective centerline.

One of the benefits of having a single forklift channel 124, 128 generally along a centerline $CL_{F/A}$ or $CL_{R/L}$ of the cart 10 is that it may, in various embodiments, enable a dual-lifting-fork forklift to pick up two carts 10 at the same time. As will be appreciated by those skilled in the art, in such embodiments the carts 10 are preferably sized so that they can be positioned adjacent each other so that their respective upper or lower single forklift access points 124 or 128 align with the spacing of the lifting forks of the forklift.

As shown in FIGS. 1 and 5, for some embodiments of a cart 10 used for carrying fluid-containing items 12, the cart 10 may also include a tapping arrangement, such as a conventional manifold system 130. Manifold systems 130 allow the user to access the fluid in the containers 12 in a controlled manner, such as by regulating flow rates, display internal container pressures, and/or draining a first container before accessing a second container, and so on. The manifold system 130 may be connected adjacent (e.g., to) the upper portion $UP_F$ of the frame 16 and include at least one valve that can be connected to any one or all of the fluid-containing items 12. The cart 10 may also include a manifold cover (not shown), for protecting the manifold system 130 from damage from use of the cart 10 and environmental factors.

Operation of Various Embodiments of the Invention

As described above, the cart 10 according to the present invention may be used for holding and transporting various types of items 12. For example, FIG. 1 shows the cart 10 holding a plurality of cylindrical fluid canisters 12. As also described above, the cart 10 is configured to be transitioned between a standing mode in which the multiple wheels 22 of the cart 10 are retracted above bottoms 32, 48 of walls 30, 44 of the base 18 of the cart 10 and a rolling mode in which at least some of the wheels 22 are extended at least partially below the bottoms 32, 48 of the walls 30, 44 of the base 18.

FIG. 2 shows an embodiment of the cart 10 according to the present invention being in the standing mode in which wheels 22 of the cart 10 are retracted into the base body 28, above bottoms 32, 48 of walls 30, 44 of the base of the cart 10. The cartridge 64 may be secured in the retracted position in a variety of ways, such as by inserting securing pins 86 in securing pin openings 88. While the cart 10 is in the standing mode, the walls 30, 44 may directly contact the floor 84 because the wheels 22 are retracted. While in the standing mode, the cart 10 can be used to store the items 12 and users may selectively access the items 12 by removing them from the cart 10 or by using them while they are still on the cart 10. For example, for items 12 storing material (e.g., fluid such as a commercial gas) used by the user, the user may access the material in the items while the cart 10 is standing. As described above, FIG. 1 shows a manifold system 130 by which the user may tap fluid cylinders 12 positioned on the cart 10. The items 12 on the cart 10 may also be accessed and used while the cart 10 is in the mobile mode.

The user may secure the cartridge 64 and its wheels 22 in the retracted position shown in FIG. 2 by positioning the cartridge 64 in the retracted position, thereby aligning the first pin openings of the pin openings 90, 92, 94 formed in the base body 28 and cartridge body 66 and aligning the second pin openings formed in the base body 28 and cartridge body 66. The user then inserts the first and the second securing pins 86 into the respective first and second securing pin openings 88.

For rolling of the cart 10 on the retractable and extendable wheels 22, the user may extend the wheels 22 from the base body 28 of the base 18 and lock the wheels 22 into their extended position, such as shown in FIG. 4. To move the wheels 22 to their extended position, the cart 10 in many embodiments is preferably lifted off of the floor 84, such as by using a forklift or crane, which is described above and below in further detail. Once the cart 10 is lifted above the floor 84, the user may remove the securing pins 86 from their securing pin openings 88 as shown in FIG. 3, thereby allowing the cartridge 64 and wheels 22 to move to the extended position shown in FIG. 4, such as by moving downward in many embodiments of the invention. For example, the cartridge 64 and wheels 22 may move to the extended position on their own by gravity, by the user pulling them toward the extended position, and/or by a spring force created by a spring mechanism (not shown), which may also be part of the base 18 as described above. Such a spring mechanism may be configured to bias the cartridge 64 and wheels 22 toward their retracted position for assisting the user in transitioning the cart 10 from the mobile mode to the standing mode.

The user may secure the cartridge 64 in the extended position by passing the first and second securing pins 86 through the respective first and second securing pin openings 90 of the outer wall 30, over the top 96 of the cartridge body 66, and through the respective first and second securing pin openings 92 of the inner wall 44, thereby securing the cartridge in the extended position by keeping the cartridge 64 from moving past the pins, such as keeping the cartridge 64 from moving upward past the pins. For embodiments of the cart 10 described above having additional pin holes or openings (not shown) in the cartridge 64, the user may secure the cartridge 64 and wheels 22 in the extended position by moving the cartridge 64 and the wheels 22 to the extended position and inserting the pins into the openings 90 of the outer wall 30, through the additional openings, and through the openings 92 of the inner wall 44.

When the cartridge 64 and wheels 22 are secured in the extended position, the user can replace the cart 10 on the floor 84, if it was lifted, so that the wheels 22 contact the floor 84. The user may then push or pull the cart 10 to roll it along the floor 84. For embodiments of the cart 10 described above having one or more middle or central wheels 72 (shown in FIG. 4) of the multiple wheels 22, the user may turn the cart 10 while it is in the rolling mode by slightly tilting the cart 10 about the middle wheel thereby generally putting more weight on the middle wheel 72 and less on the other wheels 76, at least at times, for facilitating turning of the cart 10. Turning is facilitated in this way because the lower weight on the non-middle wheels 76 leaves these wheels 76 interfering less with turning and leaves the cart 10 more freely turnable on the middle wheels 72.

When the user wishes to transition the cart 10 from the mobile mode to the standing mode, the user may retract the cartridge 64 and wheels 22 into the base body 28 of the base 18 to the position shown in FIG. 2. To move the wheels 22 to their retracted position, the cart 10 in many embodiments may again be lifted off of the floor 84, such as using a forklift or crane. Once the cart 10 is lifted above the floor 84, the user may remove the securing pins 86 from their securing pin openings 88, thereby allowing the cartridge 64 and wheels 22 to move to the retracted position, such as by moving them upward in many embodiments of the invention. For example, the cartridge 64 and wheels 22 may be moved toward the retracted position by the spring force created by the spring mechanism (not shown), which may be a part of the base 18 as described above, and/or by the user pushing or pulling the cartridge 64 and wheels 22 toward the retracted position. The user may secure the cartridge 64 in the retracted position by placing the first and second securing pins 86 in the respective first and second securing pin openings 90 of the outer wall 30, the cartridge body 66, and the inner wall 44.

For moving the cart 10 without rolling it on its wheels 22, such as may be preferred for lifting the cart 10 for transitioning it between the standing and rolling modes or for moving the cart 10 far distances (e.g., from one side of a factory to another) or between elevations (e.g., up to a bed of a transporting delivery truck), the cart may be lifted by forklift or other lifting devices (not shown). For lifting by forklift, the user of the cart 10 may insert lifting forks of the forklift into the lower pair of lifting channels 126 or the upper pair of lifting channels 122 (shown in FIG. 1). FIG. 5 also shows an embodiment of the cart 10 having a first and a second upper pair of lifting channels 122, 123 and a first and second lower pair of lifting channels 126, 127. Once the forks of the forklift are positioned in one of the pair of channels 122, 123, 126, 127 of the cart 10, the forklift can be used to lift and move the cart 10 as desired.

The cart 10 may also include one or more single lifting channels 124, 128. FIG. 1 shows an upper single lifting channel 124 and FIGS. 1 and 5 show a lower single lifting channel 128. For lifting the cart 10 using one of the single lifting channels 124, 128, the user may position a fork of the forklift in the single lifting channel. As described above, one benefit of the cart 10 having single lifting channels 124, 128 is that the user may be able to pick up two carts 10 according to the present invention at the same time using a single forklift or other lifting device using the single channels. To lift two carts 10 using a single forklift, for example, the user positions the carts 10 adjacent each other so that the single channels 124, 128 to be accessed, whether upper single channels 124 (FIG. 1) or lower single channels 128 (FIGS. 1 and 5), are both accessible from the same direction. The carts 10 may be moved into position in a number of ways including by using the dual forklift channels 122, 126 of each cart to individually move each cart 10 into position, by using the crane-eye hooks 120, or moving the cart 10 on its wheels 22. After the carts 10 are properly positioned, the user may insert one of the two forks of the forklift into the respective, upper or lower, single channel 124, 128 of each cart 10. Once the forks of the forklift are positioned in the single channel 122, 126 of each cart 10, the forklift can be used to lift and move the cart 10 as desired.

For embodiments of the cart 10 having one or more crane-eye hooks 120, such as those shown in FIG. 5, the user may lift and move the cart 10 using a crane or other lifting device and those hooks 120. As described above, lifting by crane-eye hooks 120 is especially useful in applications in which the cart 10 needs to be hoisted high in the air, such as from a dock to a ship or oil rig platform or from the ground up to a building being constructed.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A mobile cart for carrying a plurality of fluid canisters, the cart being adjustable between a standing mode and a rolling mode and comprising:

a platform configured to support the fluid canisters during operation of the cart;

a base connected adjacent the platform including a right base system and a left base system on which the mobile cart stands and rolls during operation of the cart, each of said base systems including:

a base body having an outer wall having a bottom, multiple slots extending generally vertically, a first outer wall pin opening, and a second outer wall pin opening and having an inner wall having a bottom, multiple slots extending generally vertically and aligned with the outer wall slots, and a first inner wall pin opening and a second inner wall pin opening aligned with the first and second outer wall pin openings, respectively;

a cartridge positioned at least partially within said base body including:

a cartridge body having a first cartridge body pin opening and a second cartridge body pin opening;

multiple axles extending from the cartridge body and through corresponding slots of the multiple slots in the outer wall and in the inner wall; and multiple in-line wheels connected to respective axles of said multiple axles so that the wheels can rotate about the axles and the cartridge is slidable up and down with respect to the base body; and at least two pins including a first pin and a second pin sized and shaped for sliding into and out of the first and second pin openings of the outer wall, the inner wall, and the cartridge body;

wherein each cartridge may be selectively moved up with respect to the respective base body to a retracted position, wherein none of the wheels of the cartridge extend below the bottoms of the inner and outer walls, and may be held in that position by the first and second pins being positioned in the respective first and second pin openings of the respective outer wall, cartridge body, and inner wall;

wherein each cartridge may be moved down with respect to the respective base body to an extended position, wherein all of the wheels of the cartridge extend below the bottoms of the inner and outer walls, and may be held in that position by the first and second pins being positioned in the respective first and second pin openings of the respective outer wall and inner wall; and wherein the mobile cart is in the rolling mode when the cartridge of each base system is in the extended position and the mobile cart is in the standing mode when the cartridge of each base system is in the retracted position.

2. The mobile cart according to claim 1 wherein the multiple wheels of the cartridge of each base system includes a middle wheel being larger than two outside wheels.

3. The mobile cart according to claim 1 wherein each of the pins includes an engagement portion movable between an engaged posture and a disengaged posture and biased toward the engaged posture so that when the pin is inserted into one of the pin openings to an engaged pin position for securing the cartridge in the retracted position or the extended position during operation of the cart, the engagement portion of the pin in the engaged posture engages an edge of the inner wall surrounding the pin opening in which the pin is inserted, thereby securing the pin in the engaged pin position and limiting an ability of the pin to move out of the engaged pin position.

4. The mobile cart according to claim 1 further comprising a frame including a right side, a left side, an upper portion, and a lower portion, wherein:

the platform is connected to the frame adjacent the lower portion of the frame and the platform is configured to support the fluid canisters during operation of the cart; and wherein the frame further includes internal stabilizing elements extending through an interior of the frame and, when the cart is holding the fluid canisters, extending between canisters, wherein the frame includes metal welded together and all welds of the mobile cart are visible to an inspector of the cart while the cart is fully loaded with the canisters.

5. The mobile cart according to claim 4 further including a manifold system connected to the upper portion of the frame including a valve connectable to any or all of the fluid canisters.

6. The mobile cart according to claim 4 wherein the upper portion of the frame includes four corners and four eyelets, one at each corner, to which a user of the cart may connect for hoisting and moving the cart.

7. The mobile cart according to claim 4 wherein the upper portion of the frame includes a central hoisting eye to which a user of the mobile cart may connect a lifting device for hoisting and moving the cart.

8. The mobile cart according to claim 4 wherein the upper portion of the frame forms two forklift channels extending in parallel so that a user of the mobile cart can insert forks of a forklift into the channels from a first side or end of the frame or alternatively from a second side or end of the frame for lifting and moving the cart.

9. The mobile cart according to claim 4 wherein the upper portion of the frame forms an upper central forklift channel so that a user of the mobile cart can insert a fork of a forklift into the upper central forklift channel from a first side or end of the frame or alternatively from an opposite side or end of the frame for lifting and moving the cart.

10. The mobile cart according to claim 9 wherein the mobile cart is sized and shaped so that a user of the cart operating a forklift having two forks can pick up and move the mobile cart by inserting one of the two forks into the upper central forklift channel while at the same time picking up and moving a second and structurally equivalent mobile cart including inserting the other of the two forks into an upper central forklift channel of the second cart.

11. The mobile cart according to claim 1 wherein the outer wall, the inner wall, and the cartridge body of each base system includes sets of forklift openings including a first forklift opening and a second forklift opening arranged so that all of the first forklift openings align with each other and all of the second forklift openings align with each other when the cart is in the standing mode so that a user of the cart can insert two forks of a forklift into the forklift openings from a right side of the base or from a left side of the base for lifting and moving the cart.

12. The mobile cart according to claim 1 wherein the base is configured such that the right base system and the left base system are spaced apart forming a lower central forklift channel between them so that a user of the mobile cart may insert a fork of a forklift into the lower central forklift channel from a first end of the base or from a second end of the base for lifting and moving the cart.

13. The mobile cart according to claim 12 wherein the mobile cart is sized and shaped so that a user of the cart operating a forklift having two forks can pick up and move the mobile cart by inserting one of the two forks into the lower central forklift channel while at the same time picking up and moving a second and structurally equivalent mobile cart by inserting the other fork of the two forks into a lower central forklift channel of the second cart.

14. A mobile cart for carrying items, the cart being adjustable between a standing mode and a rolling mode and comprising:

a platform configured to support the items during operation of the cart; and a base connected to the platform including a base system on which the mobile cart stands and rolls during operation of the cart, the base system including:

a base body having an outer wall including a bottom and a plurality of slots extending vertically, an inner wall having a bottom and a plurality of slots extending generally vertically and being aligned with the slots in the outer wall, and a base body securing element;

a cartridge positioned at least partially within said base body having:

a cartridge body;

a plurality of axles extending from the cartridge body and through corresponding slots of the plurality of slots in the outer wall and of the plurality of slots in the inner wall; and a plurality of wheels rotatably connected to respective axles of said plurality of axles, so that the cartridge is slidable up and down with respect to the base body; and a cartridge securing element to which the base body securing element may be selectively mated for securing the cartridge in a retracted position when the cartridge is slid up with respect to the base body and in an extended position when the cartridge is slid down with respect to the base body, wherein none of the plurality of wheels extend below the bottom of the inner and the outer walls of the base body when the cartridge is in the retracted position and all of the plurality of wheels extend below the bottom of the inner and outer walls of the base body when the cartridge is in the extended position;

wherein the mobile cart is in the rolling mode when the cartridge is in the extended position and the mobile cart is in the standing mode when the cartridge is in the retracted position.

15. A mobile cart for carrying a plurality of fluid canisters, the mobile cart comprising:

a platform configured to support the fluid canisters during operation of the cart; and a base connected to the platform and including a base body and a plurality of wheels movably connected to the base body so that the wheels can be selectively moved with respect to the base body between: (1) an extended position, in which the plurality of wheels extends from the base body so the cart can roll, on the plurality of wheels, over the support surface supporting the cart; and (2) a retracted position, in which the plurality of wheels is retracted relative to the base body so that the cart cannot roll, on the plurality of wheels, over the support surface; wherein:

the base body has at least one wall having a bottom, multiple slots extending generally vertically, a first wall pin opening, and a second wall pin opening;

the base further includes:

a cartridge positioned at least partially within the base body, the cartridge having a cartridge body having a first cartridge body pin opening and a second cartridge body pin opening; and multiple axles extending from the cartridge body and through corresponding slots of the multiple slots in the wall;

the wheels are connected to respective axles of the multiple axles so that the wheels can rotate about the axles and the cartridge is slidable up and down with respect to the base body; and one or more securing elements configured and positioned to selectively secure the cartridge to the base body to secure the wheels in the retracted position or the extended position.

16. A mobile cart according to claim 15 further comprising a frame having a lower portion, wherein the platform is connected to the frame adjacent the lower portion of the frame and the base is connected to the frame.

17. A mobile cart according to claim 15 wherein:

said at least one wall is an at least one outer wall;

the base body has at least one inner wall having a bottom, multiple slots extending generally vertically and aligned with the outer wall slots, and a first inner wall pin opening and a second inner wall pin opening aligned with the first and second outer wall pin openings; and said one or more securing elements includes at least two pins including a first pin and a second pin sized and shaped for sliding into and out of the first and second pin openings of the outer wall, the inner wall, and the cartridge body.

* * * * *